May 25, 1926.
J. N. WATTS
1,586,495
CULTIVATOR ATTACHMENT
Filed July 10, 1925
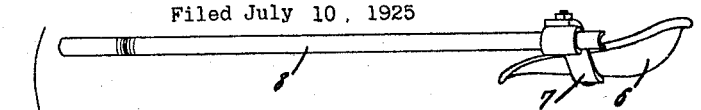
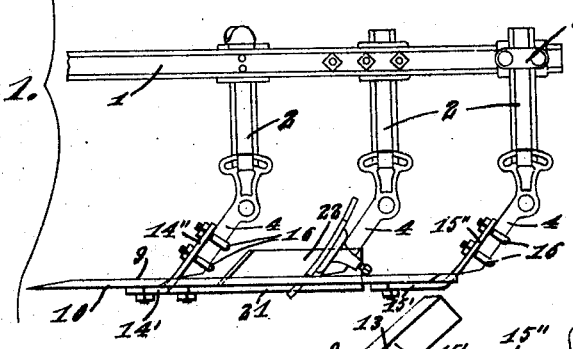
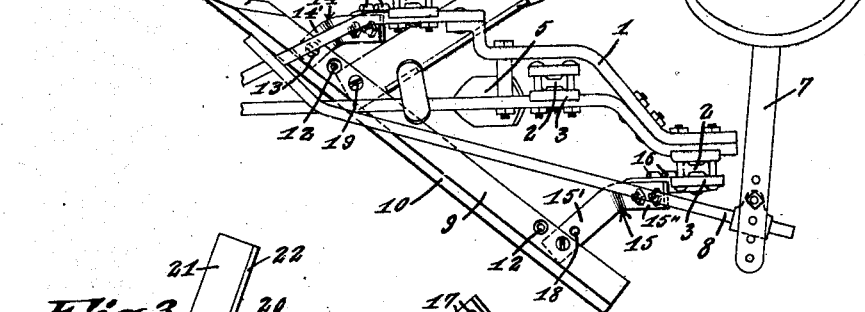
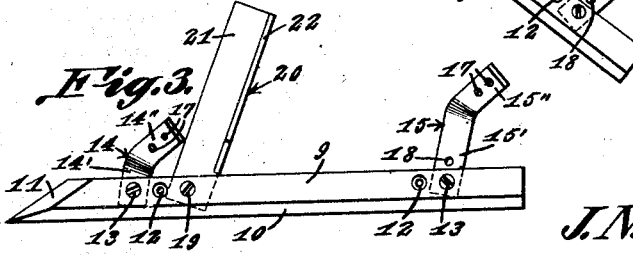
J. N. Watts, INVENTOR.
BY
Geo. P. Kimmel, ATTORNEY.

Patented May 25, 1926.

1,586,495

UNITED STATES PATENT OFFICE.

JAMES N. WATTS, OF CLYDE, TEXAS, ASSIGNOR OF ONE-HALF TO JULIAN F. BAILEY, OF ABILENE, TEXAS.

CULTIVATOR ATTACHMENT.

Application filed July 10, 1925. Serial No. 42,747.

This invention relates to cultivator attachments and pertains particularly to a combined weeding and hoeing device adapted to be fixed to and across two or more shanks of a cultivator machine.

The primary object of this invention is the provision, in a manner as hereinafter set forth, of a device mounted upon a cultivator as described and designed to cut away weeds from both sides of a hill and at the same time to hoe up the dirt upon each side of a hill and bank the same about the plant as the cultivator passes thereover.

The invention contemplates the provision of a pair of steel cutting blades having tapered or angled points and each provided with a pair of standards by means of which the blades are secured to the shanks of a cultivator machine with the angled points converging and in spaced relation. These blades are designed to travel on each side of the plant hill to cut away any weeds which might be growing there. Each blade is provided with an angled member, the said angled members having their free ends converging toward the rear of the cultivator and acting as the cultivator moves along the hill to rake or hoe up the dirt upon either side of the hill and bank the same about the plant.

A further and final object of this invention is the provision, in a manner as hereinafter set forth, of a device of the character described which will be of simple construction, strong and durable, easily and quickly applied and removed from a cultivator machine, efficient for the purpose intended and inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claim.

In the drawing Figure 1 shows in side elevation a portion of the rear of a cultivator showing the device embodying this invention secured to the cultivator shanks.

Figure 2 is a top plan view of the above mentioned rear portion of a cultivator showing the elements embodying this invention in plan.

Figure 3 is a detailed plan view of one of the elements embodying this device.

Referring now to the drawing in detail wherein like numerals of reference indicate corresponding parts throughout the several views, there is indicated by the numeral 1 the supporting beams of a cultivator for supporting the shanks 2 in position. These shanks are shiftably held by means of clips 3 and at the lower end of each of the shanks there is pivotally secured the foot 4 to which a plow such as that indicated by the numeral 5 is attached.

The usual seat structure is indicated at 6, supported across the central portion of the cultivator by the supporting strap 7 which strap in turn is supported by the rearwardly extending arms 8 which extend from the axle of the cultivator (not shown).

The structure above set forth is usual and forms no part of the present invention.

The devices embodying this invention comprise a pair of cutting blades 9. These blades are usually used in pairs and are exactly alike and the description will be confined to one only.

Each blade is of substantial length as is shown and has one edge bevelled as at 10 to provide a cutting edge. The forward end of each blade is triangularly shaped and the angled edge is also bevelled to provide the cutting edge 11. A pair of apertures 12 is formed in the blade adjacent each end thereof and secured to the blade by a pair of securing screws 13 which are passed through these apertures are supporting brackets 14 and 15 respectively.

These brackets each comprise a horizontal portion 14' and 15' and an obtusely angled upwardly extending portion 14" and 15". The portion 14' of the bracket 14 is of less length than the portion 15' of the bracket 15 and the inclined portions 14" and 15" are designed to be secured each to one of the feet 4, after the shovel 5 has been removed therefrom, by means of J bolts 16, the curved portion of which extends behind the foot 4 while the shank extends through apertures 17 formed in the inclined portion of the securing brackets. When the cutting blades 9 are in position upon the cultivator, they assume the relative positions shown in Figure 2, the bevelled angled pointed portion being in convergent spaced relation.

The portion 15' of the bracket 15 is provided with an additional aperture 18 by means of which an adjustment can be made in the relation of the elements.

Each blade is provided with an additional aperture rearwardly of the forward aperture 12 and this aperture is designed to receive a retaining screw 19 which passes through one end of an elongated angled member indicated as a whole by the numeral 20. This angled member constitutes a hoeing device and comprises a relatively long flat portion 21 which is designed to scoop up the earth and this portion is extended to meet the blade 9 and is secured thereto by the screw 18. Formed at right angles to this portion is an up-standing back portion 22 which is of less length than the portion 21, as shown in Figure 3, and serves to prevent the earth passing over the top of the portion 21 thus guiding the same off of the open end and allowing it to pile up around the plants in the row being worked.

The hoeing elements 20, as shown in Figure 3, are set at an acute angle with respect to the cutting blades 9 and when the blades are in convergent relation as shown in Figure 2, the free ends of the hoeing elements 30 also converge beneath the central portion of the cultivator. The rear ends of the hoeing elements are in spaced relation as are the cutting blades 9 and after the cutting blades have removed all weeds from the sides of the hill being worked, the hoeing elements work up the earth on each side of the hill and the back boards 22 of the hoeing elements force the earth over toward the center of the hill about the plant.

The hoeing elements are also adjustably secured to the blades 9 for the screw 18 which retains the elements connected with the blades can be passed through the adjacent one of the apertures 12 to change the position of the hoeing elements.

From the foregoing description it will be readily seen that there has been provided a new and novel weed cutting and hill working device which may be easily and quickly attached to a cultivator and which is also serviceable and efficient.

Having thus described my invention what I claim is:—

A device of the character set forth, comprising a pair of pointed cutting blades, an inwardly and upwardly extending arm adjustably secured adjacent each end of each blade to secure the blades in forwardly convergent relation beneath a cultivator, a hoe element comprising an elongated flat portion adjustably secured at one end to each blade and extending inwardly and rearwardly therefrom, and a back board extending vertically along the rear edge of each flat portion to cause earth to be worked inwardly toward a center row formed between the inner ends of the hoeing element.

In testimony whereof, I affix my signature hereto.

JAMES N. WATTS.